United States Patent

[11] 3,560,005

| [72] | Inventor | Rene Bovagne |
| | | Chalon-sur-Saone, France |
| [21] | Appl. No. | 737,476 |
| [22] | Filed | June 17, 1968 |
| [45] | Patented | Feb. 2, 1971 |
| [73] | Assignee | Societe des Forges et Ateliers du Creusot |
| | | Paris, France |
| | | a company of France |
| [32] | Priority | June 16, 1967 |
| [33] | | France |
| [31] | | 110,657 |

[54] SEAL FOR A ROTATING CHAMBER
9 Claims, 8 Drawing Figs.

[52] U.S. Cl................................................ 277/147,
                                                    277/193
[51] Int. Cl.................................................. F27b 7/24
[50] Field of Search........................................ 263/32,
                        32A, 33; 277/147, 192, 193, 138

[56]                References Cited
            UNITED STATES PATENTS
2,826,403   3/1958   Moklebust..................   263/33
2,882,613   4/1959   Jacobson......................  263/32Aux
3,007,690  11/1961   Koniewiez....................   263/33
3,012,765  12/1961   Deussner.....................   263/32Aux
3,383,115   5/1968   Eckley et al.................   277/192X
            FOREIGN PATENTS
1,240,400   7/1960   France........................   263/32A
1,202,207   9/1965   Germany.....................    263/32A Primary Examiner—Laverne D. Geiger
Assistant Examiner—Edward J. Earls
Attorney—Cameron, Berkam and Sutton

ABSTRACT: A seal is provided between a rotating chamber and a stationary cap by providing the rotating chamber with an annular collar secured to the chamber by a partition. The stationary cap carries a sealing ring which is urged into engagement with the collar by resilient means, the ring engaging the whole periphery of the collar.

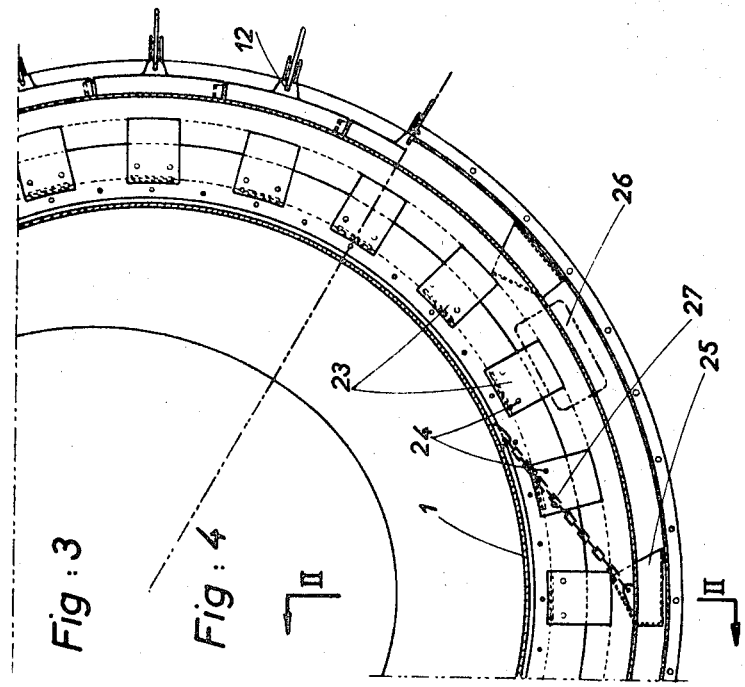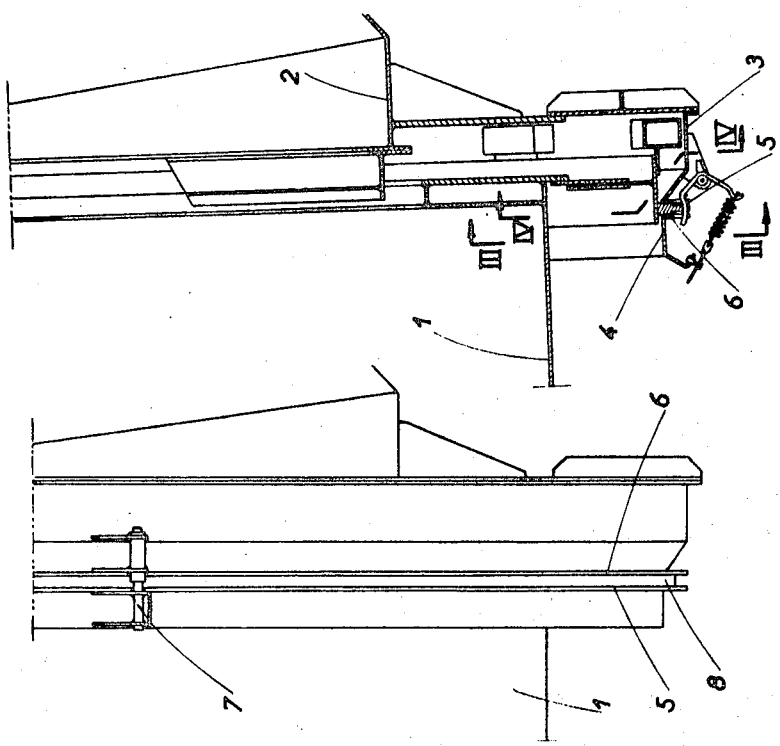

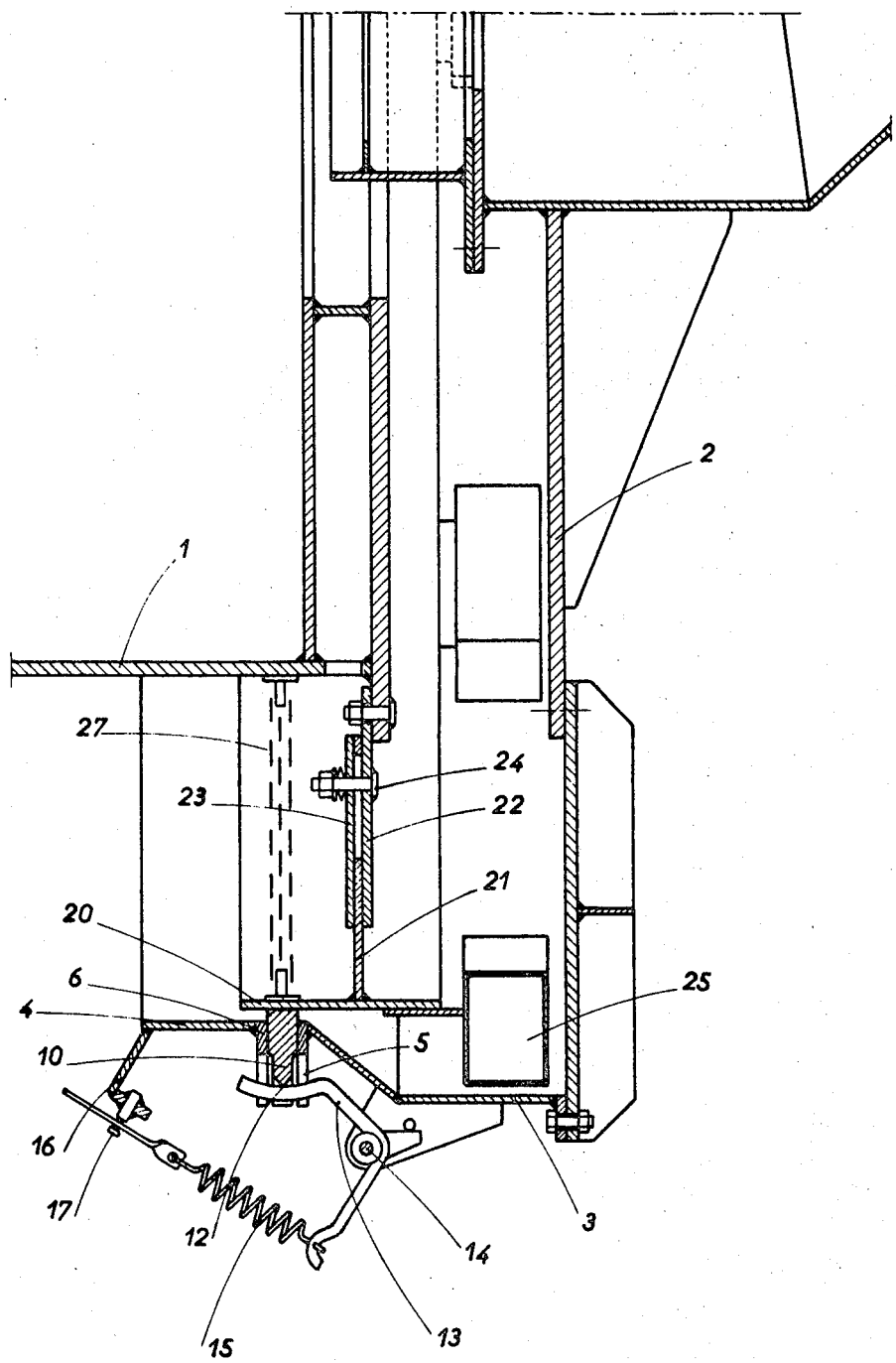
Fig: 5

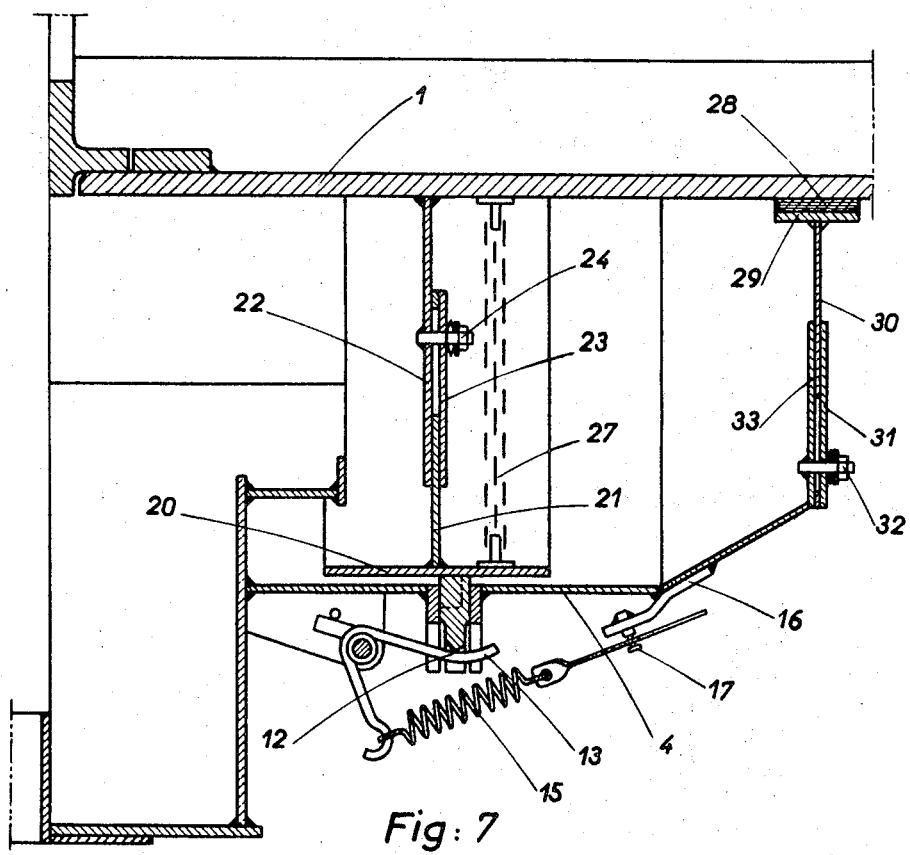
Fig: 6
Fig: 7
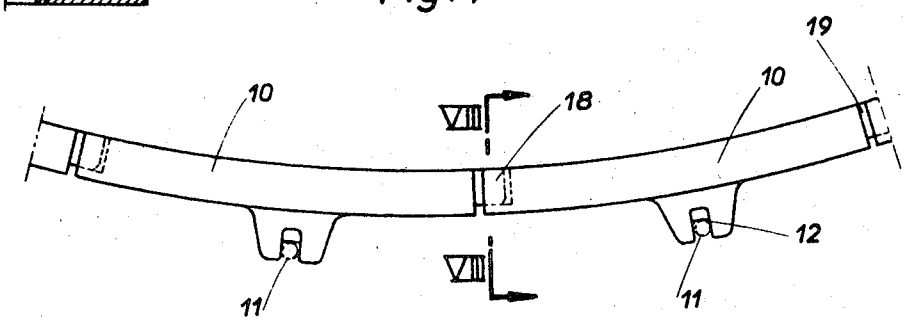
Fig: 8
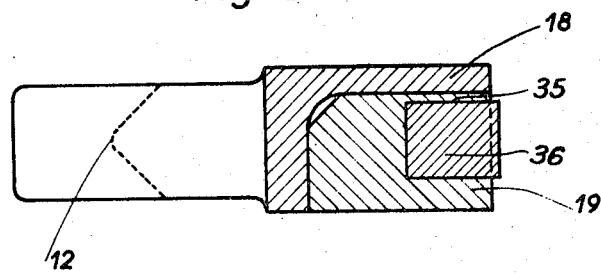

SEAL FOR A ROTATING CHAMBER

The invention relates to a gasket for a rotating chamber, more particularly for a rotating furnace having an inclined axis.

As a rule, rotating chambers are supported by rotating rollers, and their ends fit into stationary caps which, in the case of rotating axially inclined furnaces, are a downstream heating cap and an upstream smoke box.

In furnaces of the aforementioned type, an airtight seal is required between the rotating chamber and the stationary end caps. As a rule, an ordinary seal cannot be used, owing to the temperature in the furnace and the resulting deformation. The normal seals, therefore, are of the labyrinth type, i.e. they comprise baffles which lengthen the path taken by gases escaping from the furnace and thus reduce the leakage rate. These seals are fairly complicated, they are rapidly filled with matter deposited from the gases, and they are difficult to take apart.

The aim of the invention is to obviate these disadvantages by means of a seal which is fixed to the cap and presses against the chamber but can adapt to any deformation of the chamber.

According to the invention, the gasket comprises a collar surrounding and axially parallel to the chamber and attached to it by an annular partition, and a sealing ring guided in a plane perpendicular to the chamber axis by flanges mounted on the stationary cap, the ring being pressed by resilient bearing means against the whole periphery of the collar.

The invention will now be described in greater detail with reference to an exemplary embodiment shown in the drawings, in which:

FIG. 1 is a partial side view of the upstream end of the rotating furnace;
FIG. 2 is a section along II–II in FIG. 4;
FIG. 3 is a section along III–III in FIG. 2;
FIG. 4 is a section along IV–IV in FIG. 2;
FIG. 5 shows a detail of the upstream seal along II–II in FIG. 4;
FIG. 6 shows a detail of the downstream seal across the same plane as that indicated by II–II, FIG. 4, in the case of the upstream seal;
FIG. 7 shows a detail of two sealing bars; and
FIG. 8 is a section along VIII–VIII, FIG. 7.

The rotating furnace according to the invention comprises a cylindrical chamber 1 (FIGS. 2 and 5) axially inclined to the horizontal, the upstream end being closed by a smoke box 2.

The smoke box 2 comprises a stationary cap 3 and a moving cap 4 each provided with flanges 5 and 6. The moving cap 4 is connected to stationary cap 3 by an extending support 7 (FIG. 1) which leaves the space 8 between flanges 5 and 6 in which a sealing ring is guided, the sealing ring comprising a plurality of identical bars 10, two of which are shown in detail in FIGS. 7 and 8.

Halfway along each bar 10 there is a yoke 11 (FIG. 8) containing a blade 12 on which a push lever 13 rests. Each lever 13 pivots round a pivot 14 (FIG. 5) fixed to cap 3. One end of lever 13 rests on bar 10 and the other end is connected by a traction spring 15 to an arm 16 integral with the moving cap 4. The tension of spring 15 can be adjusted by an adjusting screw 17.

Each bar 10 is fitted into the adjacent bars by the mortise and tenon system 18 and 19. Sufficient clearance is left to allow the bars to slide longitudinally with respect to one another.

Bars 10 are pressed by levers 13 against a collar 20 surrounding chamber 1 and axially parallel with it. Collar 20 is fixed to an annular partition 21 pressed against a second annular partition 22 by lugs 23 gripped by bolts 24. Annular partition 22 is integral with chamber 1.

The surfaces of bars 10 in contact with collar 20 have substantially the same curvature as the collar. As a result, the bars form a continuous ring of variable lengths which always rests against the friction zone consisting of collar 20. When the collar diameter increases because of expansion, bars 10 slide on one another while remaining in contact, and the sealing ring follows the deformation of collar 20, while remaining sealing-tight.

Partition 21 can also slide on partition 22 and thus become out-of-center while being kept in contact by lugs 23. The furnace thus remains sealing-tight on the occasions when it is out-of-circular.

Cap 3 is adapted to collect dust in its lower part. The dust is evacuated by scoops 25 (FIGS. 4 and 5) fixed to collar 20 and distributed at regular intervals round the collar periphery.

A flap 26 on the upstream surface of cap 23 enables the scoops to be checked and replaced. It can easily be seen that, when the furnace rotates, the scoops collect the dust deposited in the lower part of stationary cap 3 and recirculate it by discharging it in the upper part of the furnace.

Chains 27 at regular intervals round the furnace are fixed to chamber 1 and collar 20. The rotation of the chamber is consequently transmitted to collar 20 while still allowing the collar to be out of center with respect to the chamber.

The downstream gasket in FIG. 6 is similar to the upstream gasket which has been described with reference to FIG. 5. Like components bear like references in FIGS. 5 and 6.

The downstream gasket does not comprise scoops 25 for lifting the dust.

An additional, asbestos gasket 28 (FIG. 6) can also be provided, supported by a collar 29 fixed on a ring 30 which, in the same manner as ring 21, is pressed by lugs 31 held by bolts 32 against the ring 33 integral with movable cap 4. The asbestos gasket 28 is consequently in contact with chamber 1 and the additional tightness is likewise adequate on the occasions when the furnace is out-of-circular.

Finally, so that the friction surface can be lubricated while dry, a hollow 35 can be made on the surface of bars 10 in contact with collar 20, and a lump of graphite 36, for example, can be inserted. The bars can alternatively be made of cast iron treated with graphite.

The invention, of course, is not limited to the details of the embodiments described. More particularly, use could be made of any other sealing ring of variable length, pressed against the sealing collar by resilient bearing means. Alternatively, the collar can be connected to the chamber and caused to rotate with it, using any means enabling the collar to be somewhat out-of-center with respect to the chamber when the chamber rotates.

Finally, the system of scoops fixed to the chamber and described in the example can be replaced by any other device, e.g. vanes, for recirculating dust deposited at the bottom of the cap, without exceeding the scope of the invention.

I claim:

1. A seal for a rotating chamber in the form of a solid of revolution, rotating about its axis, at least one end of which fits in a stationary cap, comprising a collar surrounding and axially parallel to the chamber and attached to it by an annular partition, and a sealing ring guided in a plane perpendicular to the chamber axis by flanges mounted on the stationary cap, the ring being pressed by resilient bearing means against the whole periphery of the collar.

2. A seal according to claim 1, said sealing ring comprising a plurality of bars fitting into one another and thinner than the length of the collar, each bar being pressed against the collar by a lever pivoting round a pivot fixed to the cap.

3. A seal according to claim 1, said annular partition comprising two adjacent rings, one integral with the collar and the other integral with the chamber, the two rings being pressed against one another by bolted lugs.

4. A seal according to claim 1, said collar being connected to the chamber by a plurality of driving chains.

5. A seal according to claim 2, said bars being connected by mortise and tenon joints.

6. A seal according to claim 1, said end cap including a stationary collar and a movable collar connected to the stationary collar by an extending support, the matching edges of said collars forming flanges receiving said ring.

7. A seal according to claim 2, said sealing bars being cast iron treated with graphite.

8. A sealing joint according to claim 2, said bars having graphite inserts on their surface in contact with the collar.

9. A seal according to claim 1, said cap extending annularly beyond said sealing ring, a portion of said cap being turned toward said chamber and a gasket between said turned portion of said cap and said chamber.